Nov. 8, 1966                 K. GRACE                 3,284,094
STEERABLE AXLE ARRANGEMENT FOR VEHICLE TRAILER
Filed April 3, 1964                                7 Sheets-Sheet 1
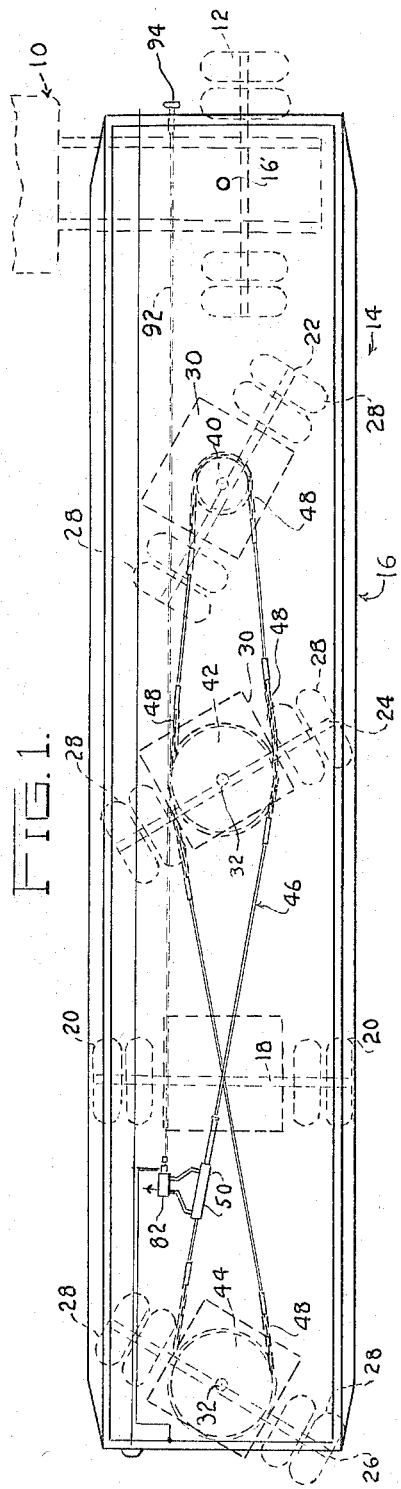
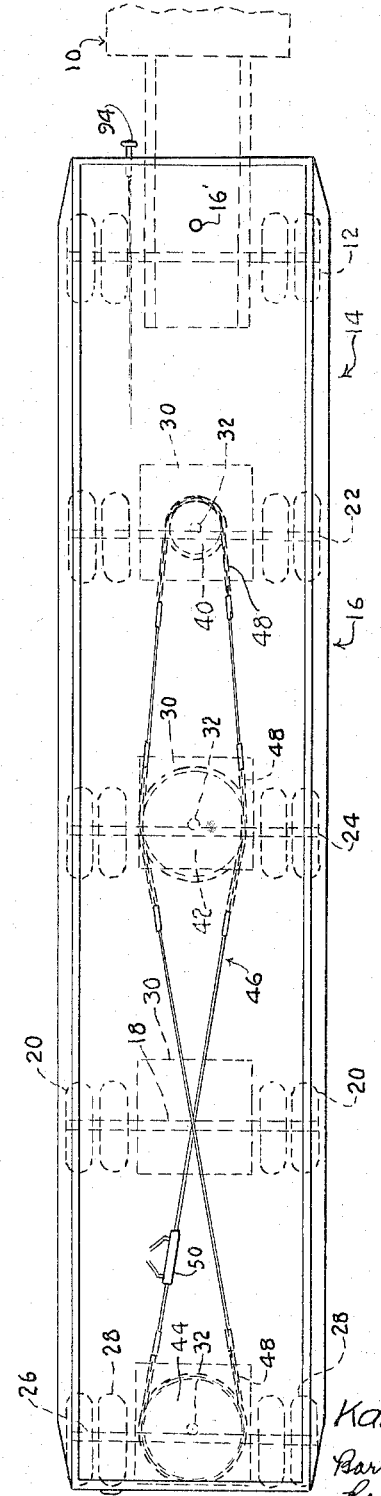
INVENTOR.
Karl Grace
Barnes, Kisselle,
Raisch + Choate
ATTORNEYS

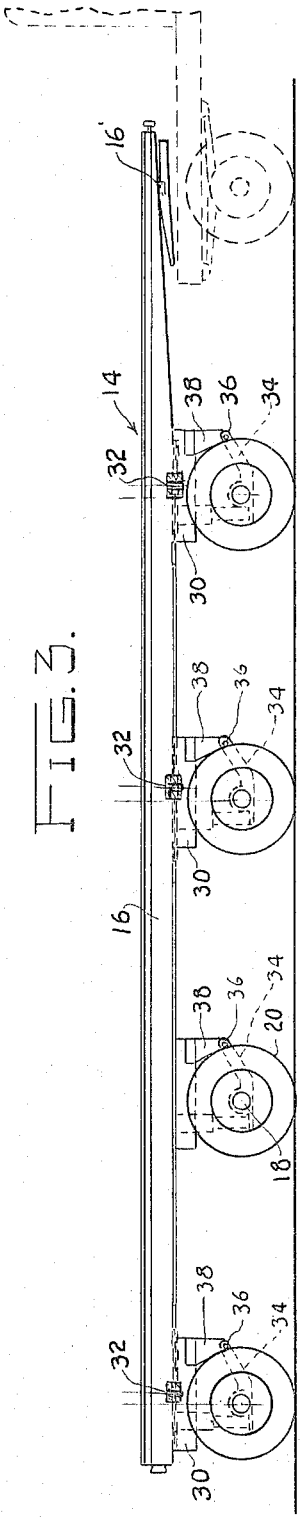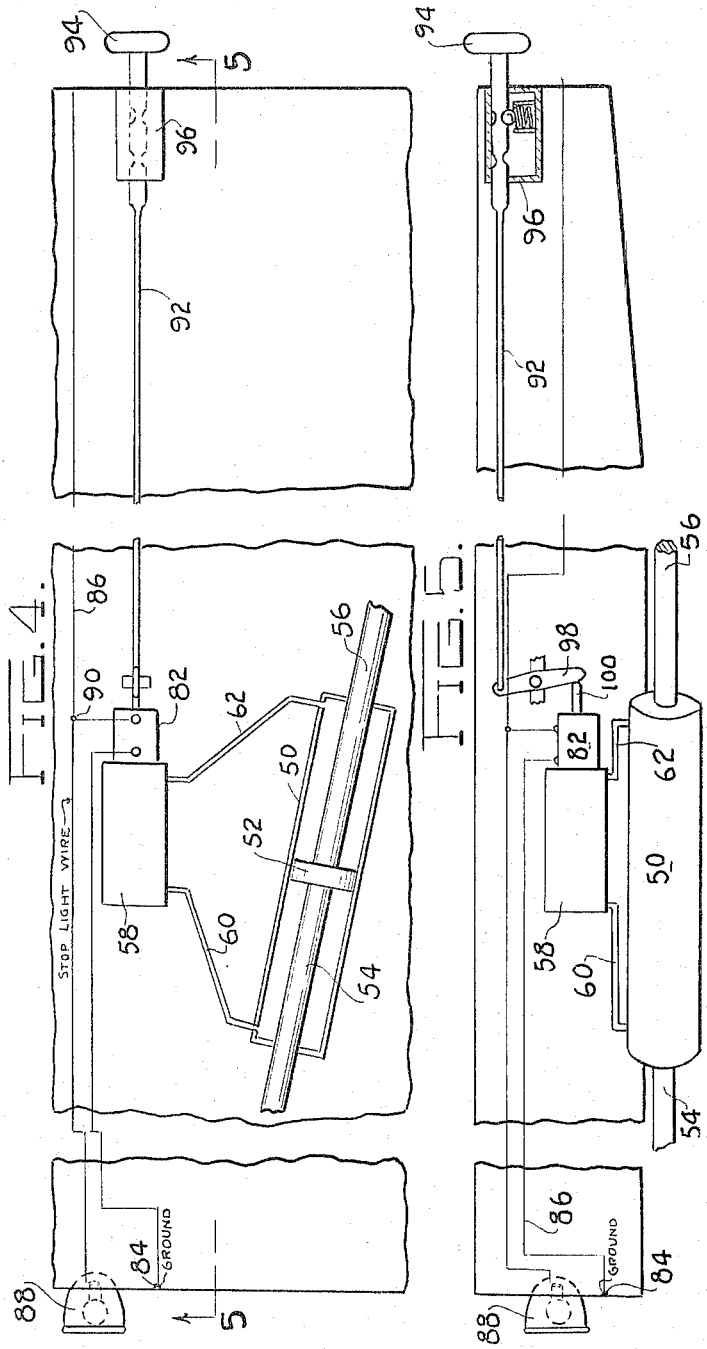

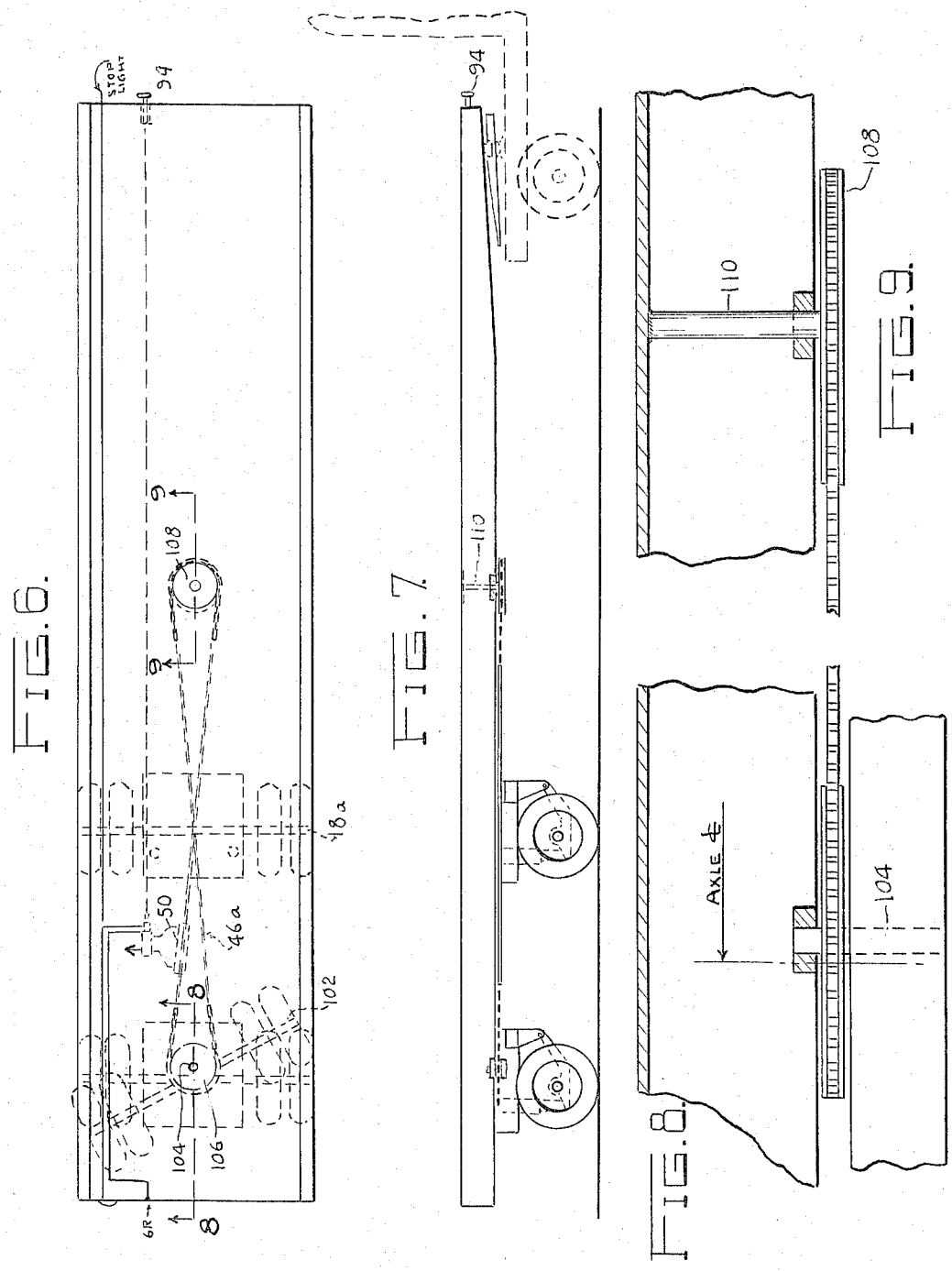

Nov. 8, 1966  K. GRACE  3,284,094
STEERABLE AXLE ARRANGEMENT FOR VEHICLE TRAILER
Filed April 3, 1964  7 Sheets-Sheet 4
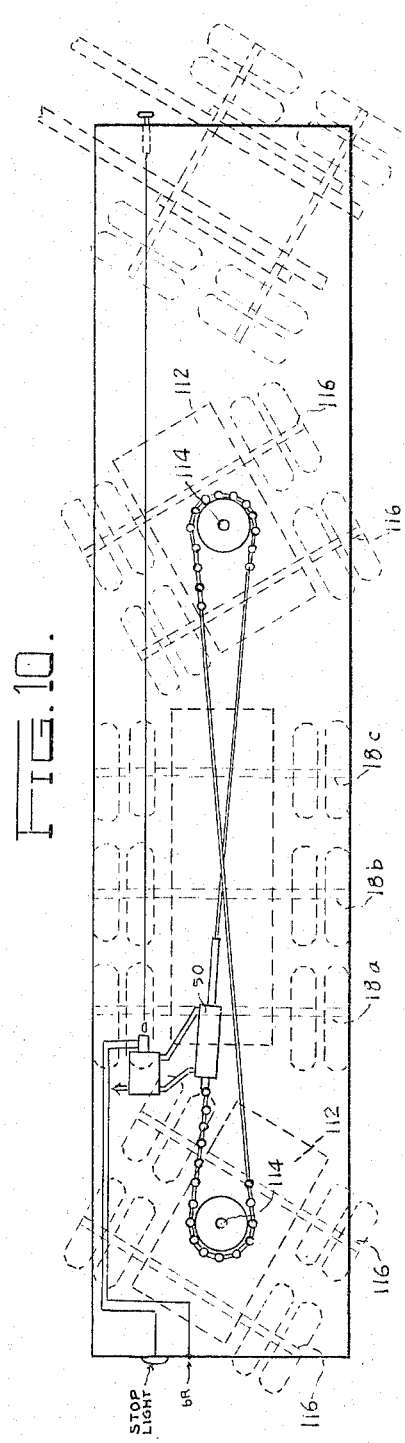
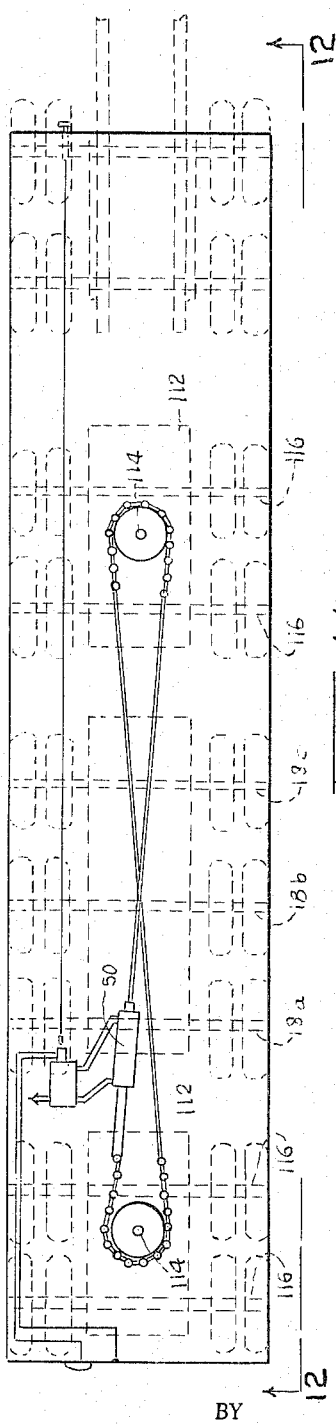
INVENTOR.
Karl Grace
BY
Barnes, Kisselle, Raisch & Choate
ATTORNEYS

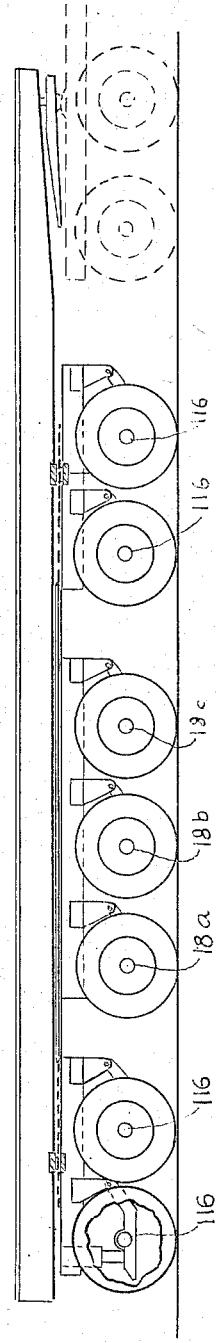
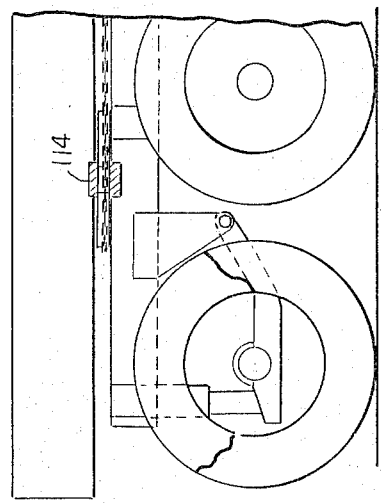
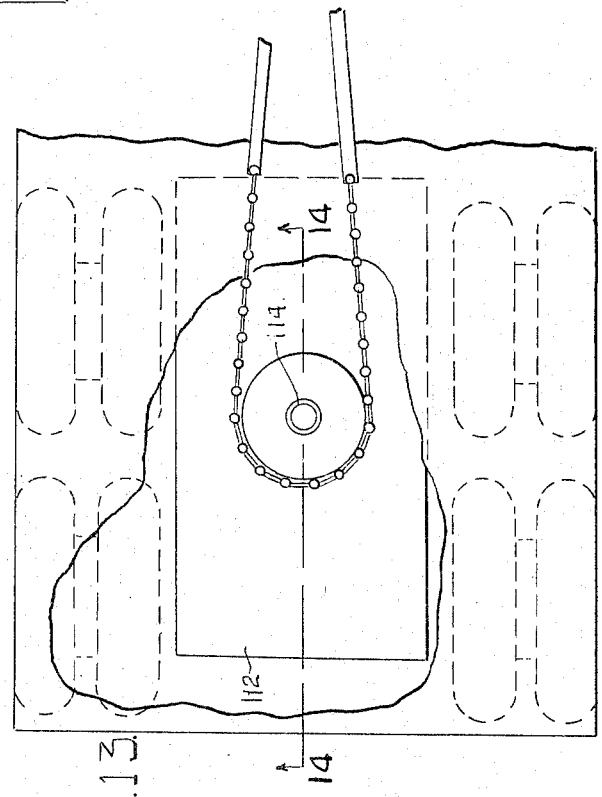

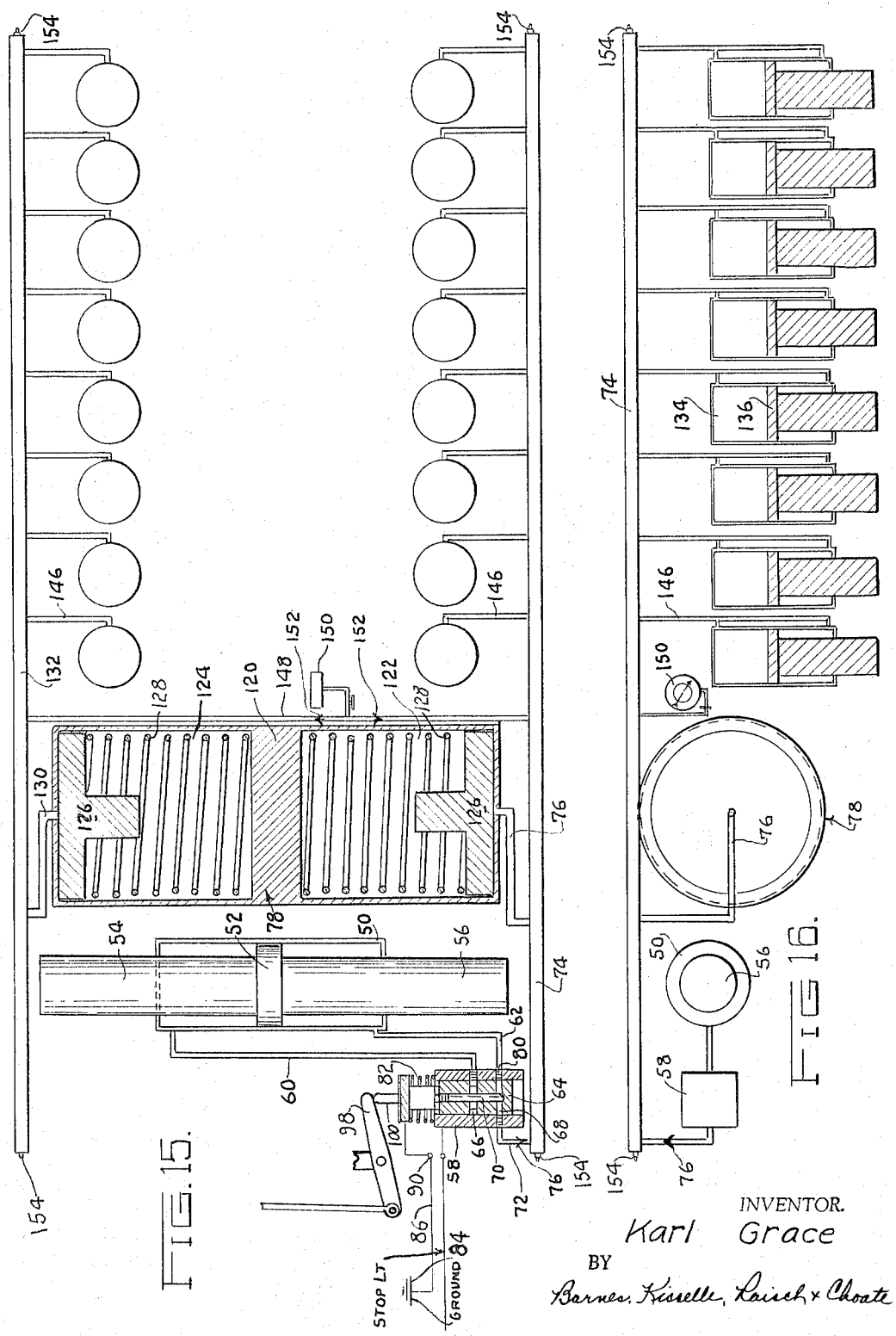

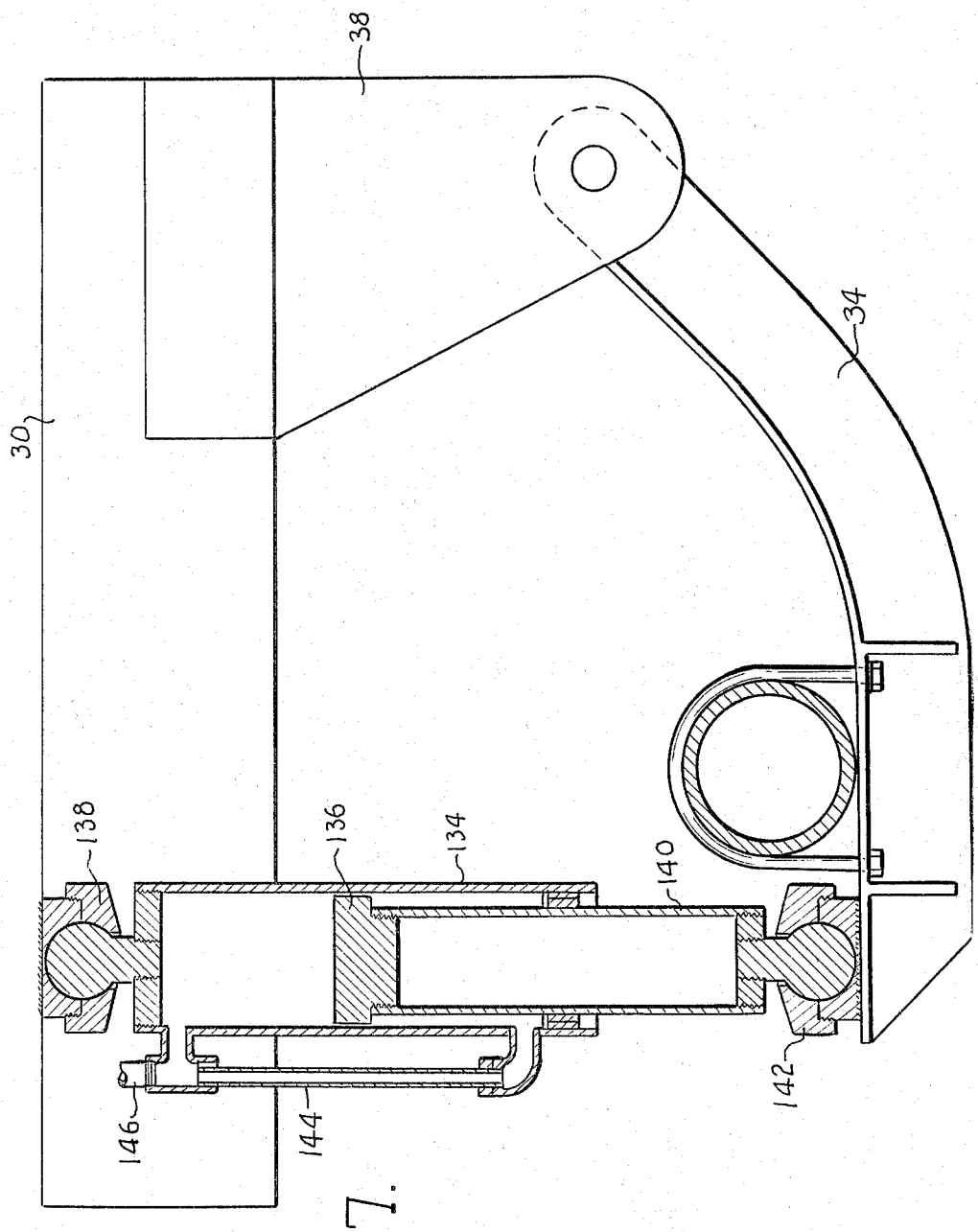

United States Patent Office 3,284,094
Patented Nov. 8, 1966

3,284,094
STEERABLE AXLE ARRANGEMENT FOR VEHICLE TRAILER
Karl Grace, 20451 Balfour Road, Harper Woods, Mich.
Filed Apr. 3, 1964, Ser. No. 357,146
9 Claims. (Cl. 280—81)

This invention relates to a vehicle trailer.

One of the ever-present problems in connection with vehicle trailers is the inability to increase the pay load of the trailer without introducing some undesirable feature in the trailer construction. For example, it is not uncommon to provide tandem axles on highway trailers so that the pay load can be increased without exceeding the maximum load limit prescribed for the highway of various States. However, the use of fixed tandem axles necessarily results in a certain amount of skidding of the trailer tires when the tractor negotiates a turn, and the use of widely spaced fixed tandem axles is impractical. It has also been proposed to provide the vehicle trailer with one or more turning or steerable axles but such constructions have always introduced an element of danger in connection with operation of the trailer, specifically the likelihood of the trailer jack-knifing.

It is an object of this invention to provide a trailer construction involving the use of steerable axles which materially increase the pay load of the trailer and which at the same time provide for absolutely safe operation of the trailer. More specifically, it is an object of the present invention to provide a trailer with a steerable axle spaced from a fixed axle, the steerable axle being mounted on the trailer so that it will properly turn with the tractor simply because of the lateral forces exerted on the tires of the wheels of the steerable axle by reason of their engagement with a ground surface.

A further object of the invention resides in the provision of one or more steerable axles on a vehicle trailer as described and the provision of means for dampening the free turning movement of the steerable axles so as to obtain a stabilized action of all the steerable axles.

Further objects and advantages of the vehicle trailer construction of this invention will become apparent from the accompanying description and drawings in which:

FIGS. 1 and 2 are somewhat schematic views of a trailer provided with one fixed and three steerable axles in accordance with the present invention.

FIG. 3 is a side elevation view of the trailer shown in FIGS. 1 and 2.

FIG. 4 is a fragmentary plan view of a trailer with a schematic showing of the hydraulic means incorporated for controlling the turning movement of the steerable axles.

FIG. 5 is a fragmentary side elevational view of the arrangement shown in FIG. 4.

FIG. 6 is a somewhat schematic plan view of a trailer according to the present invention provided with one steerable axle and a fixed axle.

FIG. 7 is a side elevational view of the trailer shown in FIG. 6.

FIGS. 8 and 9 are detail sectional views on an enlarged scale of portions of the trailer shown in FIG. 7.

FIGS. 10 and 11 are views similar to FIG. 1 and showing a trailer according to the present invention provided with two steerable tandem axles and one fixed tandem axle.

FIG. 12 is a side elevational view of the trailer shown in FIG. 11.

FIG. 13 is a fragmentary plan view on an enlarged scale of a portion of the trailer shown in FIG. 12.

FIG. 14 is a fragmentary side elevational view with parts broken away of the trailer illustrated in FIG. 12.

FIG. 15 is a schematic view illustrating the suspension system for a trailer in accordance with the present invention.

FIG. 16 is a side elevational view of the schematic arrangement shown in FIG. 15.

FIG. 17 is a sectional view on an enlarged scale showing the suspension mechanism for one of the axles.

Referring to the drawings and particularly to FIGS. 1–5, there is illustrated a tractor 10, the rear ground engaging wheels thereof being illustrated at 12. A trailer generally designated 14 is connected to the tractor 10 by the king pin 16' of a conventional fifth wheel arrangement on the tractor 10. Trailer 14 is fashioned with a frame structure 16 and towards the rear end of the trailer there is attached to frame 16 a non-steerable axle 18, the wheels at the opposite ends of which are designated 20. The trailer frame 16 has also mounted thereon three steerable axles designated 22, 24 and 26. The wheels on the steerable axles are designated 28. Each of the steerable axles is mounted on the trailer frame 16 by means of turntable platforms 30, each of which is pivotally connected to the trailer frame 16 by means of a king pin 32. It will be observed that the king pins 32 are located slightly forwardly of the center line of each of the respective axles. Each axle of the trailer is directly mounted on an arm 34 pivotally connected as at 36 to a bracket 38. In the case of the steerable axles 22, 24 and 26 the brackets 38 depend from the rotatable platform 30. In the case of the fixed axle 18 the depending bracket 38 is supported from a fixed portion of the trailer frame.

The three steerable axles 22, 24 and 26 are interconnected by linkage means that causes all three axles to turn in unison. In the specific form illustrated the linkage means comprises a sprocket on each turntable 30 and an endless cable member trained around and interconnecting the three sprockets. The sprocket on turntable 30 for axle 22 is designated 40. The sprocket on turntable 30 for axle 24 is designated 42, and the sprocket on turntable 30 for axle 26 is designated 44. In the arrangement illustrated in FIGS. 1 and 2, sprockets 42 and 44 are of approximately the same size and substantially larger in diameter than sprocket 40. The reason for this will become readily apparent as the description proceeds. The cable element interconnecting the three sprockets is generally designated 46 and adjacent each sprocket the cable member is provided with a section of chain 48 which engages its respective sprocket so that the three turntables 30 are effectively interconnected to turn in unison.

It will be observed that axle 24 is located forwardly of the fixed axle 18 to the same extent that axle 26 is located rearwardly of fixed axle 18. Thus, the two sprockets 42 and 44 are of the same size. On the other hand, note that axle 22 is spaced forwardly of the fixed axle 18 a distance approximately twice that of axle 24 and sprocket 40 is therefore considerably smaller than sprocket 42. In the arrangement illustrated the circumference of sprocket 40 is approximately half that of sprocket 42. It will also be observed that between sprockets 42 and 44 the cable member 46 crosses itself so that when axle 24 turns in one direction axle 26 turns in the opposite direction but to the same extent.

With the arrangement thus far described, it will be appreciated that when the tractor 10 is traveling along a highway and negotiates a turn, such as illustrated in FIG. 1, in view of the fact that each of the steerable axles 22, 24 and 26 are located slightly rearwardly of their turning axes, the lateral forces acting on the tires of the wheels of these axles will have a tendency to cause the adles to turn the required extent to enable the trailer to follow the tractor without any skidding of the tires on the road surface. In this connection, it will be appreciated that the turning axis of the trailer as a whole is at the fixed axle 18. Thus, the portion of the trailer forwardly of the axle 18 swings in the direction in which the tractor is turning and the portion of the trailer rearwardly of the fixed axle 18 swings in the opposite direction. Accordingly, the traction of the wheels with the road surface causes axles 22 and 24 to turn in one direction and axle 26 to turn in the opposite direction. The extent to which each axle must turn to obtain proper steering of the trailer is dependent upon the distance between the king pin 16′ and the fixed axle 18 and also the distance between the steerable axle and the fixed axle 18.

In the arrangement illustrated it is important that the turning action of all the steerable axles be stabilized so that the trailer will not sway from side to side as it travels down the road. For example, if the wheels at one end of one of the steerable axles should fall into a chuck hole or other depression in the road there would be a normal tendency for that axle to turn. Such free turning movement of the axles must be avoided, and for this reason there is built into the linkage system which interconnects the axles a means for applying a restraining force that prevents such free turning and unwanted movement of the axles. The means for restraining free turning movement of the axles is illustrated in FIGS. 4, 5 and 15. These means include a hydraulic cylinder 50 which is fixed to the trailer frame and a piston 52 within the cylinder connected to two piston rods 54, 56 which project out from opposite ends of the cylinder. Piston rods 54, 56 are connected to adjacent ends of the cable 46 so that in effect piston rods 54, 56 together with the piston 52 form an integral portion of the cable 46.

A three-way valve 58 is connected to opposite ends of cylinder 50 through conduits 60, 62. The relationship of valve 58 with the operation of the piston cylinder assembly 50, 52 is shown diagrammatically in FIG. 15. Within valve 58 there is arranged a spool 64 having a pair of spaced annular grooves 66, 68 which communicate with a central passage 70 and which are adapted to register in one position of spool 64 with the ends of conduits 60, 62. In the last-mentioned position of spool 64, groove 68 also registers with a conduit 72 which connects with a supply conduit 74. A check valve 76 in conduit 72 enables the replenishing of hydraulic fluid in cylinder 50. Supply conduit 74 is connected by means of a conduit 76 with one end of a grease accumulator 78. Grease under pressure is adapted to flow from accumulator 78 through conduits 76, 74 and 72 to the groove 68 in spool 64 and from groove 68 through the central bore 70 and to opposite ends of cylinder 50. It will be appreciated that in order for piston 52 to move axially of cylinder 50, grease must be displaced from one end of the cylinder through valve 58 and back into the opposite end of the cylinder. The grease employed in this system is preferably a commercial fibrous grease of rather high viscosity. The viscosity of the grease in combination with the diameters of conduits 60, 62 may provide a sufficient dampening effect on the flow of grease to prevent the steerable ables from turning too freely. If the viscosity of the grease in combination with the size of the conduits and passages through which the grease flows from one end of cylinder 50 to the other does not provide sufficient restriction of the free flow of the grease, then a suitable orifice such as indicated at 80 may be incorporated at valve 58 to produce the necessary restriction.

Referring now to FIGS. 4 and 5, as well as FIG. 15, it will be observed that valve 58 is operated by a solenoid 82, the coil of which is connected at one end to ground as at 84. The opposite end of the solenoid coil is connected as at 90 to the electrical wire 86 extending to the stop light 88. Stop light 88 is of course also grounded. The electrical system for the stop light is conventional and arranged such that when the brakes are applied current is supplied to wire 86 to illuminate stop light 88 and at the same time energize solenoid 82 and thus shift valve spool 64 from the position shown in FIG. 15 to a position wherein the ends of conduits 60, 62 do not register with grooves 66, 68. In the latter position conduits 60, 62 are effectively sealed from communication with one another through valve 58. Thus, when the brakes are applied cylinder 50 is effectively sealed at both ends by valve 58 and the flow of grease from one end of the cylinder to the other is prevented. Piston 52 is therefore effectively locked in a fixed position and since the piston 52 with its piston rods 54, 56 form an integral portion of cable 46 the cable is prevented from traveling and the axles 22, 24 and 26 are effectively locked in position. Since the axles are locked when the brakes are applied the danger of jack-knifing of the trailer is substantially reduced.

Means are also provided for actuating valve 58 manually. These means are in the form of a rod 92 extending lengthwise of the trailer to the forward end thereof where the rod is provided with a push-pull knob 94. A spring detent mechanism 96 is adapted for retaining rod 92 in either a forwardly or rearwardly shifted position of adjustment. The rear end of rod 92 is connected to a bell crank 98 which is adapted to engage the spring biased core 100 of solenoid 82. Thus, when rod 92 is shifted forwardly the core 100 of solenoid 82 shifts spool 64 to a position wherein the ends of conduits 60, 62 are out of registration with grooves 66, 68 so that valve 58 effectively stops the flow of grease from one end of cylinder 50 to the opposite end. The use of rod 94 for locking the wheels in an adjusted position is desirable when it is desired to back up the trailer. The wheels may thus be manually locked in any adjusted position, straight, for example, and the trailer backed up without danger of the steerable axles turning.

The trailer arrangements illustrated in FIGS. 6–14 are similar in principle to that already described. For example, in the arrangement illustrated in FIG. 6, the trailer is provided with one steerable axle 102 which, as in the previous arrangement, is adapted to pivot about forwardly offset king pin axis 104 on which the sprocket 106 rotates. Cable 46a extends around a second sprocket 108 which, in this form, is an idler sprocket, but which may be replaced by a second steerable axle if desired. Sprocket 108 is mounted to rotate on the trailer frame by means of a pin 110. Sprockets 106 and 108 are spaced equally distant from the fixed axle 18a. As in the previous embodiment illustrated, cable 46a includes the cylinder arrangement 50 which operates in a manner identical to the operation already described.

In the arrangement illustrated in FIGS. 10 through 14 the trailer is provided with three fixed axles 18a, 18b and 18c. These axles are arranged in tandem fashion. A pair of turntables 112 are pivotally supported on the trailer frame as at 114. The two king pin pivot axes 114 are spaced equally distant forwardly and rearwardly of the center fixed axle 18b. On each turntable 112 there is supported a pair of tandem axles 116. It will be observed that the pivot axes 114 are spaced forwardly of the center line between the axles 116 on each turntable 112. In other respects a trailer arrangement illustrated in FIGS. 10–14 is the same as those previously described.

Referring now to FIGS. 15–17, accumulator 78 is fashioned as a hydraulic cylinder provided with a central fixed wall 120 which divides the accumulator into two chambers 122 and 124. Within each chamber there is arranged a piston 126 and each piston 126 is biased axially outwardly by means of a spring 128. Conduit 76, which was referred to previously, connects with chamber 122 on the axially outer side of piston 126 therein. Likewise a conduit 130 connects with the outer end of chamber 124 of accumulator 78. Conduit 130 connects with a feed conduit 132. Feed conduit 132 as well as the feed conduit 74 previously referred to extend lengthwise of the trailer on opposite sides thereof.

Referring particularly to FIG. 17 it will be observed that at each turntable and at the fixed axle there is pivotally supported cylinder 134 in which a piston 136 is adapted to reciprocate. The upper end of cylinder 134 is connected to its respective turntable by means of a universal joint 138. The piston 136 in each cylinder 134 is mounted on a tubular piston rod 140, the outer end of which has a universal joint connection as at 142 with the free end of the arm 34. Opposite ends of cylinder 134 are interconnected by a conduit 144 and these conduits are in turn each connected with the feed conduits 74, 132 by means of branch conduits 146. It will be appreciated that the cylinders on one side of the trailer connect with feed conduit 132 and the cylinders on the opposite side of the trailer connect with the feed conduit 74.

The two feed conduits 74, 132 are interconnected by a conduit 148 in which is located a gage 150 for indicating the pressure in the conduit 148. Check valves 152 are provided in conduit 148 on opposite sides of gage 150. Check valves 152 enable the gage 150 to respond to the pressure in the feed conduits 74 and 132 but at the same time prevent a direct communication between these two feed conduits.

The suspension system illustrated operates in an obvious manner. Preferably when the trailer is unloaded the system is charged with grease through the grease fittings 154 until the pistons 136 in the cylinders 134 are displaced to a position approximately half-way with respect to their total travel in the cylinders, that is, to the position illustrated in FIG. 17. Springs 128 are designed such that these springs are not compressed when the grease system of an unloaded trailer is charged. Springs 128 are preferably designed so that they compress to approximately half of the length illustrated in FIG. 15 when the trailer is fully loaded. Gage 150 is calibrated to reflect the pressure in lines 74 and 132 as determined by the total tonnage on the trailer. Gage 150 is of the type in which the indicator thereof can be reset to a predetermined reading, so that by knowing the weight of the empty trailer the indicator on the gage can be set after the system is charged to the total trailer weight; thereafter when the trailer is loaded the indicator of gage 150 will reflect the total weight of the loaded trailer. If desired gage 150 can be replaced with two gages, one in conduit 132 and the other in conduit 74, and the interconnecting conduit 148 eliminated. The advantage of providing grease fittings such as illustrated at 154 resides in the fact that the system can be charged with grease with an ordinary grease gun available at a conventional filling station. After the system is once charged with grease, it will be observed that the piston cylinder arrangement provides a resilient suspension for the trailer as a whole. As the vehicle is traveling along a highway and one of the axles encounters a bump in the road, the piston in the cylinder controlling that axle will tend to move upwardly in its cylinder and in so doing will displace grease from the upper end of the cylinder. A portion of this grease will flow into the lower end of the cylinder around the hollow piston rod 140 and the excess grease will flow into the conduit system and tend to compress the spring 128 in the accumulator. In this fashion, the trailer is provided with a smooth ride.

Another advantage of the suspension system disclosed herein is that when a given load is placed on the trailer a reading of the indicator gage 150 will disclose whether or not the load is properly distributed over the length of the trailer. If the reading on gage 150 is too low, in relation to the actual load placed on the trailer, this indicates that the load is located too far forwardly so that the tractor is taking an excessive portion of the load. If the reading on gage 150 is too high, it indicates that the load is located too far rearwardly, so that the trailer axles are taking too much of the load and the tractor axle is not supporting as much of the load as it should for even load distribution.

Thus, it will be seen that the trailer arrangement of the present invention provides numerous advantages over trailer constructions of conventional design. The provision of steerable axles enables use of axles spaced the full length of the trailer and thus the pay load of the trailer can be increased because the load is distributed over a greater number of axles which are spaced apart along a greater length of the trailer. This advantage is obtained without encountering the problem of the wheels skidding when the tractor negotiates a turn. As a matter of fact the use of turning axles on the trailer enables the use of recap tires on the steerable wheels of the trailer since skidding of the tires on the road surface is essentially eliminated. The use of steerable axles spaced along the frame of the trailer also enables the use of a lighter frame construction on the trailer.

The suspension system for the axles of the trailer utilizing grease has many desirable features. In the first place, grease it not as apt to leak through fittings and other connections as is oil or air. The use of grease also avoids the problem of condensation and freezing which invariably occur with air spring systems. In addition, as pointed out previously, a grease system can be replenished easily and conveniently at any service station.

I claim:

1. In a vehicle trailer the combination of a frame, an axle fixed on the frame against turning movement, a pair of axles spaced longitudinally of the trailer frame and each spaced from the fixed axle, wheels on the opposite ends of each of said axles, each axle in said pair being pivotally mounted on the trailer frame for turning movement about a vertical axis to provide two pair of steerable wheels, means comprising a mechanical linkage mechanism interconnecting said steering axles for turning movement in unison, said linkage mechanism including means for opposing the tendency for said axles to turn freely in response to lateral forces exerted on the wheels of the pivoted axles by reason of their traction with the road surface.

2. In a vehicle trailer the combination of a frame, an axle fixed on the frame against turning movement, a pair of axles spaced longitudinally of the trailer frame and each spaced from the fixed axle, wheels on the opposite ends of each of said axles, each axle in said pair being pivotally mounted on the trailer frame for turning movement about a vertical axis to provide two pair of steerable wheels, means comprising a mechanical linkage mechanism interconnecting said steering axles for turning movement in unison, said linkage mechanism including means for opposing the tendency for said axles to turn freely in response to lateral forces exerted on the wheels of the pivoted axles by reason of their traction with the road surface, said means for opposing free turning movement of the axles including means forming a hydraulic circuit having a restriction therein which prevents free flow in the circuit, said linkage means including a hydraulic motor operable in response to turning of the axles for causing fluid flow through said hydraulic circuit.

3. The combination called for in claim 2 wherein said pivoted axles are spaced one forward of and the other rearward of said fixed axle, and said linkage means interconnects said axles for turning movement in unison in opposite directions.

4. The combination called for in claim 2 wherein said hydraulic motor comprises a piston-cylinder assembly interconnected with said linkage mechanism such that turning of said axles causes displacement of the piston within said cylinder.

5. The combination called for in claim 2 including valve means operable to positively prevent flow of fluid in the hydraulic circuit.

6. The combination called for in claim 5 wherein said valve is electrically operated.

7. The combination called for in claim 6 wherein said trailer includes an electrically operated brake light and said electrically operated valve is in circuit with said brake light to close said valve when the brake light is energized.

8. The combination called for in claim 2 wherein said trailer includes a brake system and said hydraulic circuit includes a valve operable in response to application of the brakes to positively prevent flow of fluid in said hydraulic circuit to thereby lock said axles against turning.

9. The combination called for in claim 2 wherein the fluid in said hydraulic circuit comprises grease.

References Cited by the Examiner
UNITED STATES PATENTS

| | | | |
|---|---|---|---|
| 1,513,868 | 11/1924 | Smith | 184—7 |
| 1,868,912 | 7/1932 | Plank | 280—100 |
| 2,731,276 | 1/1956 | Cross | 280—81 |
| 2,761,693 | 9/1956 | Stover | 280—81 |
| 2,916,296 | 12/1959 | Muller | 280—124 |
| 3,051,506 | 8/1962 | Stump et al. | 280—81 |
| 3,134,455 | 5/1964 | Fiorentini | 180—79.2 |
| 3,140,880 | 7/1964 | Masser | 280—124 |
| 3,195,922 | 7/1965 | Humes | 280—100 X |
| 3,204,977 | 9/1965 | Eisenhauer et al. | 280—81 |

FOREIGN PATENTS 531,438  8/1955  Italy.

KENNETH H. BETTS, *Primary Examiner.*